(12) United States Patent
Okada (10) Patent No.: US 7,654,721 B2
(45) Date of Patent: Feb. 2, 2010

(54) LED LIGHTING UNIT AND VEHICLE LAMP

(75) Inventor: Hidetaka Okada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 12/020,240

(22) Filed: Jan. 25, 2008

(65) Prior Publication Data

US 2008/0186726 A1 Aug. 7, 2008

(30) Foreign Application Priority Data

Jan. 31, 2007 (JP) ............................. 2007-021555

(51) Int. Cl.
*F21V 7/04* (2006.01)
(52) U.S. Cl. ..................... 362/612; 362/613; 362/623; 362/624; 362/625; 362/545; 362/511; 349/65
(58) Field of Classification Search ................ 362/217, 362/511, 545, 612, 613, 618, 623, 624, 625, 362/27
See application file for complete search history.

(56) References Cited

U.S. PATENT DOCUMENTS 6,712,482 B2 * 3/2004 Kawakami et al. .......... 362/623
6,890,089 B2 * 5/2005 Haering et al. .............. 362/511
7,360,937 B2 * 4/2008 Han et al. .................... 362/612

FOREIGN PATENT DOCUMENTS

JP 2004363059 12/2004

* cited by examiner

*Primary Examiner*—Stephen F Husar
(74) *Attorney, Agent, or Firm*—Cermak Kenealy Vaidya & Nakajima LLP (57) ABSTRACT

The disclosed subject matter includes an LED lighting unit that uses a light guide, and a thin vehicle lamp using the light guide and which can conform to light distribution standards for vehicle lamps. The LED lighting unit can include a light guide having one flat surface formed with many light diffusing patterns, a plurality of LEDs located along one end surface of the light guide, and a reflection board including a reflector located on a bend portion thereof. The reflection board can be located adjacent and extend along the one flat surface of the light guide. The one flat surface can form a large light distribution area with a uniform brightness. The reflector located at the bend portion of the reflection board can form a narrow light distribution having a maximum brightness at a central portion. Thus, the LED light unit can conform to optical characteristics for a vehicle lamp. A vehicle lamp using the above-described LED light unit can be relatively thin.

21 Claims, 10 Drawing Sheets

LED LIGHTING UNIT AND VEHICLE LAMP

This application claims the priority benefit under 35 U.S.C. § 119 of Japanese Patent Application No. 2007-021555 filed on Jan. 31, 2007, which is hereby incorporated in its entirety by reference.

BACKGROUND

1. Field

The presently disclosed subject matter relates to an LED lighting unit and a vehicle lamp using the same, and more particularly to an LED lighting unit using a light guide that conforms to a light distribution standard for a vehicle lamp, and a thin vehicle lamp such as a headlight, auxiliary headlight, spot light, tail light, signal lamp, traffic lamp, or other vehicle lamp using the same.

2. Description of the Related Art

A conventional LED lighting unit mounted in vehicle lamps includes a plurality of LEDs and a reflector in general. Each of the plurality of LEDs has an optical axis located in a direction towards or corresponding with a light-emission direction of the associated vehicle lamp and reflector. Therefore, the conventional LED lighting unit illuminates both a direct light emitted by the plurality of LEDs and an indirect light reflected on the reflector forward in a direction towards or corresponding with the light-emission direction via a front lens located in front of the plurality of LEDs.

In this case, because each of the plurality of LEDs possesses characteristics of an approximately point light source, both direct light emitted from the plurality of LEDs and indirect light reflected from the reflector form a light distribution so as to scatter each projection image of a plurality of point light sources on the front lens and therefore resulting in an irregularity of brightness.

Figure 10:
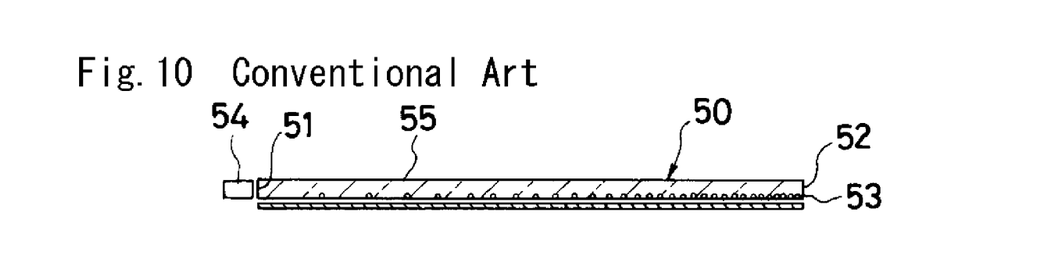
FIG. 10 is a cross-section view showing a conventional flat panel display using a plurality of LEDs.

One method for resolving the above-described problem is using a flat panel display with a uniform light distribution, which is used as a surface light source. FIG. 10 is a cross-section view showing a conventional flat panel display using a plurality of LEDs. The conventional flat display is composed of a plurality of LEDs 54 and a light guide 50 which includes one surface having many diffusing dots 53 thereon in a manner so as to increase sequentially in its density from one end surface 51 of the light guide 50 towards the other end surface 52 opposite to the one end surface 51. The plurality of LEDs 54 are located in a disperse manner along the one end surface 51, of which side is low in its density.

A light emitted from the plurality of LEDs 54 enters the light guide 50 from the one end surface 51 of the light guide 50 and diffuses on the diffusing dots 53 as the light is guided in the light guide 50. The above diffusing light is further guided in the light guide 50 and illuminates from an outgoing surface 55 to the outside. For example, the conventional art is disclosed in the following patent document No. 1:

1. Patent document No. 1: Japanese Patent Application Laid Open JP2004-363059

The flat panel display having the above-described structure can form a uniform light distribution. However, it is difficult for the flat panel display to conform to a light distribution standard for a vehicle lamp and/or to function as an LED lighting unit that is mounted in a vehicle lamp. Specifically, the flat panel display has two characteristics that make it difficult to conform to a light distribution standard for vehicle lights. One is a light distribution characteristic in which a vicinity at which a horizontal line and a vertical line cross in a light distribution pattern is the brightest point and the brightness at measuring points spaced away from the crossing point gradually decreases as the distance from the crossing point increases. The other characteristic is a brightness characteristic that makes it difficult to meet brightness requirements or standard at each of the measuring points.

The above-described problem may be technically resolved by increasing the number of LEDs. However, because the number of LEDs is limited to a size of a light guide that is limited to a size of a vehicle lamp, the above-described problem may not be practically resolved.

The disclosed subject matter has been devised to consider the above and other problems and characteristics. Thus, an embodiment of the disclosed subject matter can include an LED lighting unit using a light guide that conforms to a light distribution standard for a vehicle lamp, and can include a thin vehicle lamp using the LED lighting unit with a favorable light distribution pattern. In addition, when the LED lighting unit is used as a flat panel display such as a back light unit and the like in a personal computer, a vending machine, etc., it can also be used as a lighting unit for illuminating a front of its display unit along with a flat panel display.

SUMMARY OF THE DISCLOSED SUBJECT MATTER

The presently disclosed subject matter has been devised in view of the above and other characteristics, desires, and/or problems in the conventional art, and to make certain changes to the existing structure of a flat panel display using a plurality of LEDs. An aspect of the disclosed subject matter includes providing an LED lighting unit using a light guide with a more favorable light distribution pattern as an LED lighting unit mounted in a vehicle lamp. Another aspect of the disclosed subject matter includes providing vehicle lamps using the LED lighting unit that can conform to a light distribution standard for a vehicle lamp and can result in a thin vehicle lamp.

According to an aspect of the disclosed subject matter, an LED lighting unit can include: a light guide forming a flat panel with a transparent material and including two end surfaces being opposite to each other, one flat surface between one end surface and the other end surface forming a number of light diffusing patterns thereon; a plurality of LEDs that locates along the one end surface of the light guide so that each optical axis thereof is parallel to each other and is oriented towards the other end surface opposite to the one end surface of the light guide; and a reflection board composed of a flat member along with a reflector on a bend portion thereof that locates on the one flat surface of the light guide, the bend portion thereof that is formed by bending one end portion thereof extending in an opposite direction of the one end surface than the other end surface of the light guide at a predetermined angle towards the other end surface of the light guide.

In the above-described exemplary LED lighting unit, a diffusing intensity of the number of light diffusing patterns on the one flat surface of the light guide can sequentially increase from the one end surface towards the other end surface. The light guide can also become thin from the one end surface thereof towards the other end surface thereof. In addition, each of the number of light diffusing patterns can form a round shape or a polygonal shape.

According to the above-described aspect of the disclosed subject matter, because a light illuminated from the other flat surface of the light guide can include many diffusing lights reflecting with a diffuse reflection on the light diffusing patterns of the one flat surface, the light can form a relative large light distribution with a uniform brightness. In addition, a light reflecting on the reflector of the bend portion on the reflection board can include many lights that cannot reflect on the both flat surfaces of the light guide, the light can form a relative narrow light distribution having a maximum brightness on a central portion. Thus, the LED lighting unit can conform to optical characteristics for a vehicle lamp.

Moreover, the light distribution forming on the reflector of the bend portion can be adjusted by changing a reflecting angle of the bend portion. The uniformity of the above-described light distribution illuminated from the other flat surface of the light guide can be also improved by increasing a diffusing intensity of the number of light diffusing patterns on the one flat surface sequentially from the one end surface towards the other end surface and thinning a thickness of the light guide from the one end surface towards the other end surface.

In the above-described LED lighting unit, the one end surface of the light guide includes the respective two-dimensional concave surfaces as each central axis corresponding to each optical axis of the plurality of LEDs. In this case, because each of the plurality of concave surfaces can receive a light into the light guide with a high efficiency, the LED lighting unit can conform enough to the optical characteristics for a vehicle lamp. Thus, the plurality of concave surfaces can result in a decrease of the number of LED.

Another aspect of the disclosed subject matter, a vehicle lamp can include at least the one LED lighting unit and a casing attaching to the at least one LED lighting unit. The vehicle lamp can also include other lighting unit in the casing.

According to another aspect of the disclosed subject matter, the vehicle lamp can become as thin as both thickness of the light guide and the reflection board. Thus, the vehicle lamp can expand a possibility of design thereof.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
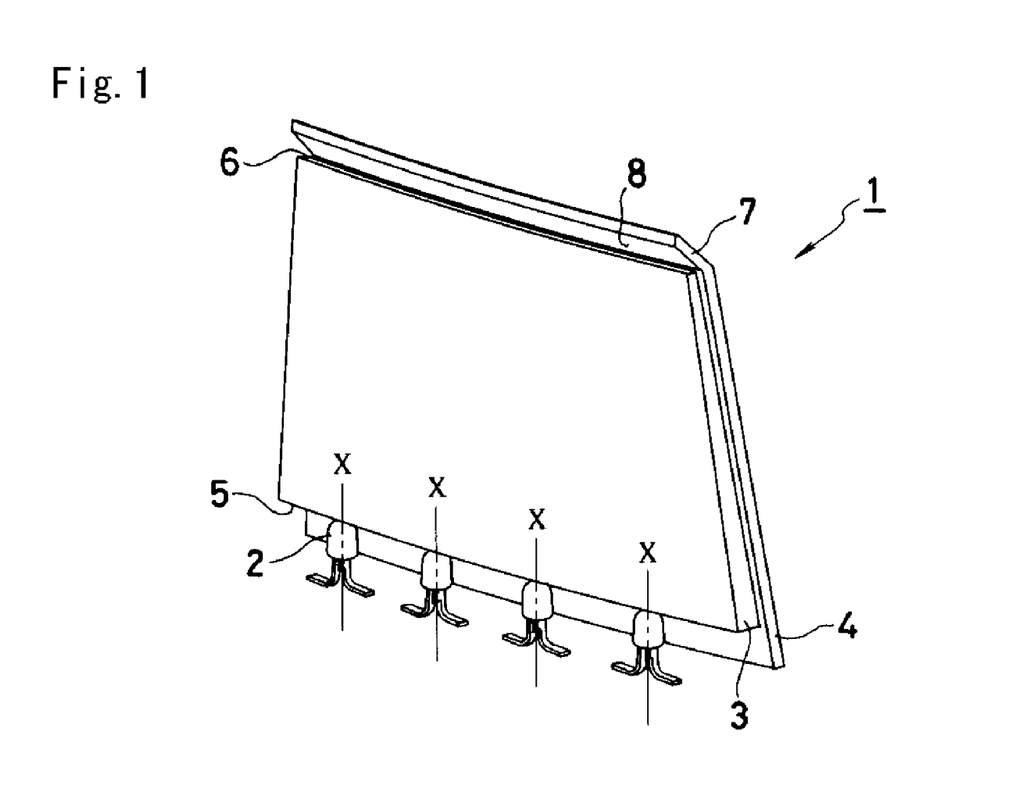
FIG. 1 is a perspective view showing an example of an LED lighting unit made in accordance with principles of the disclosed subject matter.
Figure 2:
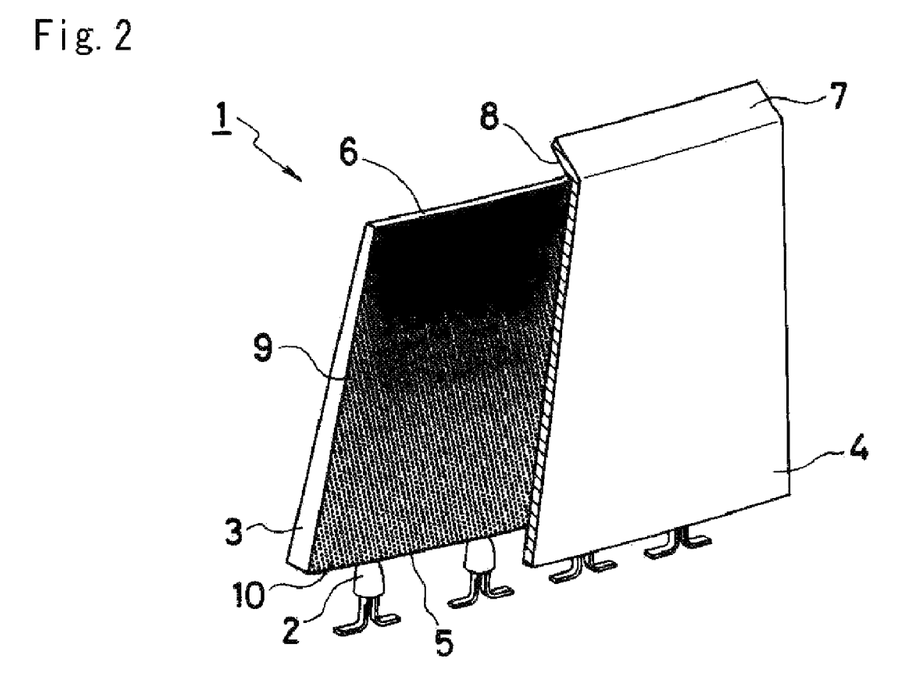
FIGS. 2 is a partial opposite perspective view of the LED lighting unit shown in FIG. 1.

The disclosed subject matter will now be described in detail with reference to FIGS. 1 to 9. The same or corresponding elements as shown with reference to FIGS. 1 to 9 use the same reference marks. FIG. 1 is a perspective view showing an example of an LED lighting unit made in accordance with principles of the disclosed subject matter and FIG. 2 is a partial perspective view from the opposite direction of the LED lighting unit shown in FIG. 1.

As shown, an LED lighting unit 1 can be composed of a plurality of LEDs 2 configured for use as a light source, a light guide 3 and a reflection board 4 as described in detail later. Each of the plurality of LEDs 2 can be a dome-shaped LED encapsulating an LED chip with a transparent resin and can be disposed at a substantially equal interval so that each optical axis thereof is parallel with respect to each other.

The light guide 3 can be composed of a transparent material and formed in a flat shape. However, the light guide 3 can also be formed as a tapered panel that becomes thin from one end surface 5 thereof towards the other end surface 6 opposite to the one end surface 5. The plurality of LEDs 2 can be located along the one end surface 5 of the thick side of the light guide 3 so that each optical axis X thereof can be oriented towards the other end surface 6. In this case, the one end surface 5 and the other end surface 6 of the light guide 3 can be flat and formed without a concave and/or convex shape.

The reflection board 4 can be composed of a flat member and can be located on a flat side of the light guide 3. One end portion of the reflection board 4 extending in a direction away from the one end surface 5 of the light guide 3 can bend at a predetermined angle at a bend portion 7 and in a direction towards a plane containing the light guide 3 and possibly towards the other end surface 6. The portion above the bend portion 7 can form a reflector 8 on a side surface thereof. That is to say, the reflector 8 of the reflection board 4 and the other end surface 6 of the thin side of the light guide 3 can be opposite to each other and arranged at a predetermined angle with respect to each other.

Figure 3:
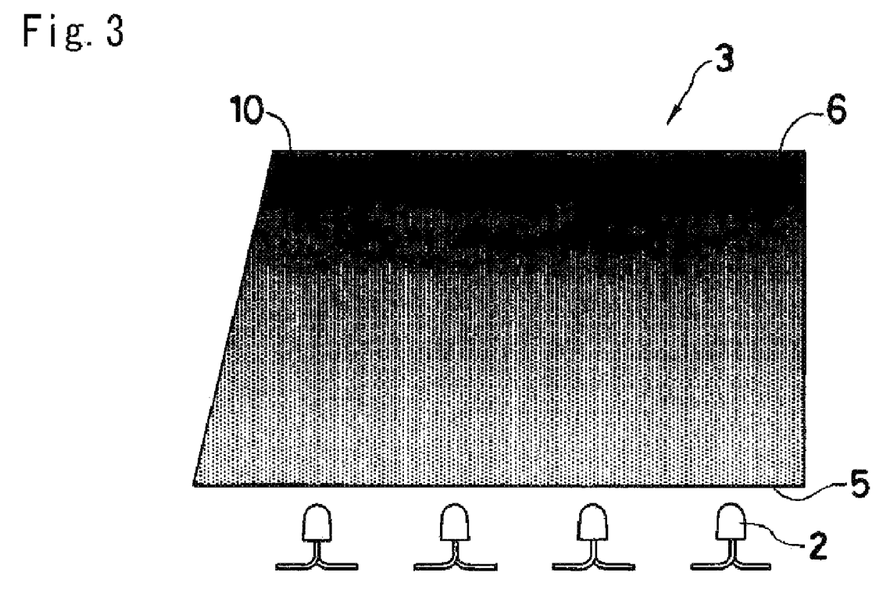
FIGS. 3 is a rear view of a light guide including a LED lighting unit made in accordance with principles of the disclosed subject matter.
Figure 4:
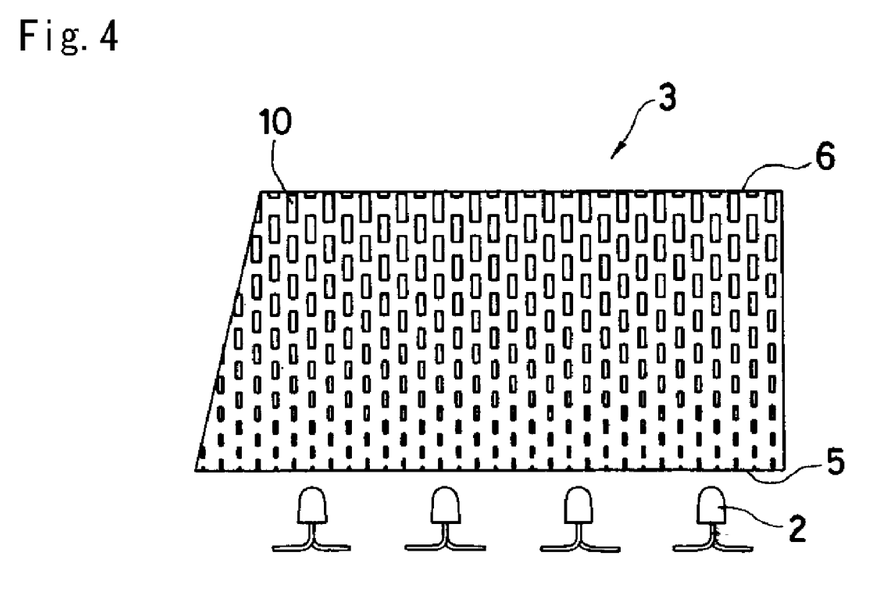
FIG. 4 is a rear view showing another exemplary light guide including a LED lighting unit made in accordance with principles of the disclosed subject matter.

FIG. 2 is a perspective view showing the LED lighting unit of FIG. 1 from a direction of the reflection board 4 with a part of reflecting board 4 removed for ease in understanding. As shown in FIG. 2, one flat surface 9 of the light guide 3 located on a side near to the reflection board 4 can include a number of light diffusing patterns 10 formed thereon. The light diffusing patterns 10 can be formed by a printing process, a cast embossing process, a dotting process, etc., and a shape thereof can be circular as shown in FIG. 3, rectangular as shown in FIG. 4, etc.

Each of the light diffusing patterns 10 can sequentially increase in its diffusing intensity from the one end surface 5 at which the plurality of LEDs 2 are disposed, towards the other end surface 6 opposite to the one end surface 5. Regarding methods for increasing diffusing intensity, one can increase a density of the light diffusing patterns 10 as shown in FIG. 3 by enlarging the individual elements of the pattern(s) such that they sequentially become larger in area thereof from the one end surface 5 towards the other end surface 6 as shown in FIG. 4. In the cases of cast embossing and doting, depths of cast embossing and doting can sequentially become deeper from the one end surface 5 towards the other surface 6.

Figure 5:
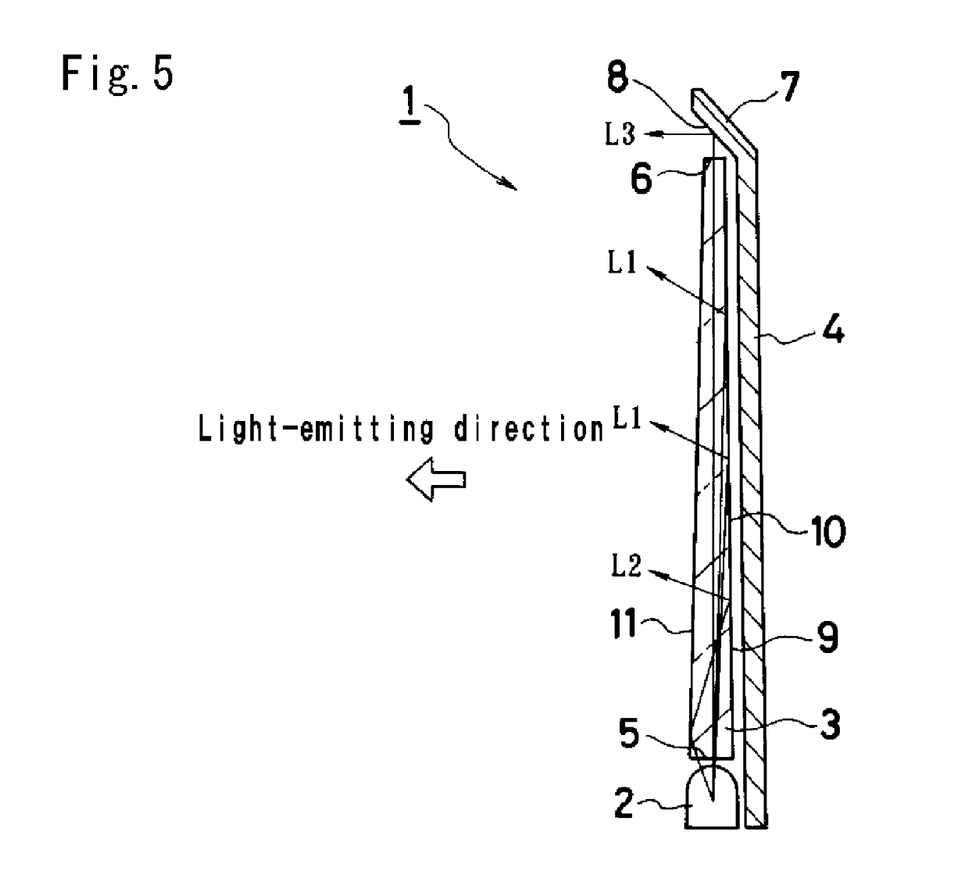
FIG. 5 is a cross-section view depicting of a LED lighting unit made in accordance with principles of the disclosed subject matter.

In the LED lighting unit 1 of the above-described structure, light emitted from the plurality of LEDs 2 can enter the light guide 3 from the one end surface 5 corresponding to the thick side of the light guide 3. Light L1 that reaches directly to the one flat surface 9 of the light guide 3 of the light entering the light guide 3 can reflect with a total reflection or a diffuse reflection on the flat surface 9 of the light guide 3 and can reach the other flat surface 11 opposite to the one flat surface 9 of the light guide 3. The light L1 can be emitted from the other flat surface 11 to an outside area and in a direction towards light-emission of the LED lighting unit 1. In this case, light that reaches the light diffusing patterns 10 forming on the one flat surface 9 reflects with a diffuse reflection on the light diffusing patterns 10 and a diffusing light can be illuminated from the other flat surface 11 to the outside area.

The portion of light L2 that is directly incident on the other flat surface 11 opposite to the one flat surface 9 of the light guide 3 from the light that is emitted from the plurality of LEDs 2 and which enters into the light guide 3 can be totally reflected from the other flat surface 11 and directed to the one flat surface 9 of the light guide 3. This portion of the light L2 that reaches the one flat surface 9 can be totally reflected or can be diffusely reflected by the one flat surface 9 and can then be incident again on the other flat surface 11, and can be emitted from the other flat surface 11 to an outside area and in a light-emission direction of the LED lighting unit 1. In this case, light that reaches the light diffusing patterns 10 formed on the one flat surface 9 can be diffusely reflected by the light diffusing patterns 10 and a diffusing light can thus be emitted from the other flat surface 11 to an outside area similar to light L1.

In addition, the portion of light L3 that is directly incident on the other end surface 6 opposite to the one end surface 5 of the light guide 3 (from the light that is emitted from the plurality of LEDs 2) can be emitted to the outside area via the other end surface 6 and can then be incident on the reflector 8 located at and/or above the bend portion 7 of the reflection board 4. In addition, a portion of the light L3 may reach the other end surface 6 after being guided in the light guide 3 and subjected to repeated total reflection between the one flat surface 9 of the light guide 3 and the other flat surface 11 opposite to the one flat surface 9. This portion of the light L3 can also be emitted to the outside area via the other end surface 6 and can reach the reflector 8 at or above the bend portion 7 on the reflection board 4.

Light L3 that reaches the reflector 8 at or above the bend portion 7 on the reflection board 4 can be reflected by the reflector 8 and the reflected light can illuminate in a direction towards the light-emission direction of the LED lighting unit 1.

A light illuminated or emitted in a direction corresponding to the light-emission direction of the LED lighting unit 1 can include both light L1 and L2 emitted/illuminated from the other flat surface 11 after being guided by the light guide 3, and a light L3 reflected by the reflector 8 of the bend portion 7 of the reflection board 4 after being emitted to an outside area via the other end surface 6 of the light guide 3. The above-described lights L1, L2 and the light L3 can respectively differ with reference to an outgoing surface from which the respective light is illuminated or emitted.

In this case, both lights L1 and L2 can be emitted or illuminated from the other flat surface 11 and can include diffused light which has been reflected via the light diffusing patterns 10 of the light guide 3. Thus, both light L1 and L2 can form a relatively large light distribution with a uniform brightness. On the other hand, because the light L3 that is reflected on the reflector 8 of the bend portion 7 of the reflection board 4 can include light that has not been subject to reflection during travel through the light guide 3, the light L3 can form a relatively narrow light distribution having a maximum brightness on a relative small central portion by adjusting a reflecting angle of the bend portion 7 and illuminating a central portion in an illuminating area of the LED lighting unit 1.

Thus, the LED lighting unit 1 can meet certain characteristic criteria such as brightness, light distribution pattern and the like that are especially required for a vehicle lamp. However, light may be emitted from the one flat surface 9 towards the reflection board 4 and can include light guided in the light guide 3 after reflecting via total reflection or diffuse reflection via the one flat surface 9. This light reaches the one flat surface 9 of the light guide 3 after being emitted from the plurality of LEDs 2 and entering into the light guide 3. Because the above-described light cannot operate as an illuminating light of the LED light unit 1, the existence of such light causes a decrease of light use efficiency.

Figure 6:
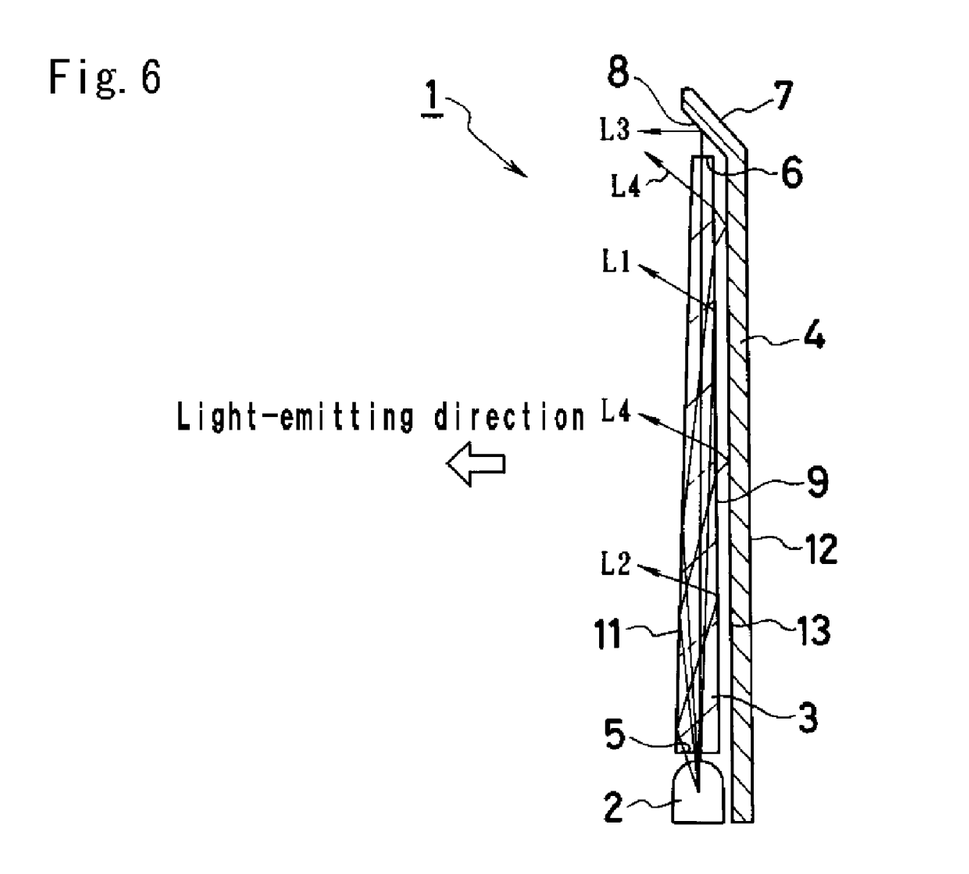
FIG. 6 is a cross-section view depicting the another example of an LED lighting unit made in accordance with principles of the disclosed subject matter.

Therefore, the LED light unit 1 can include a reflector 13 formed on a flat portion 12 of the reflection board 4 which can operate in combination with the reflector 8 on the bend portion 7 of the reflection board 4 as shown in FIG. 6. The light use efficiency can improve by reflecting light that is emitted from the one flat surface 9 of the light guide 3 towards the reflector 13 of the flat portion 12 of the reflection board 4 and returning the reflected light into the light guide 3.

In that case, the light that is emitted from the plurality of LEDs 2 and which enters into the light guide 3 includes both a light L1 that reaches the other flat surface 11 of the light guide 3 after reaching directly the one flat surface 9 of the light guide 3 and reflecting with total reflection (or diffuse reflection) on the one flat surface 9. This light can be emitted from the other flat surface 11 to an outside are in a direction corresponding to the light-emission direction of the LED lighting unit 1, similar to manner described with respect to FIG. 5.

In addition, light L2 that reaches the other flat surface 11 of the light guide 3 after total or diffuse reflection on the one flat surface 9 and/or after reaching the other flat surface 11 of the light guide 3 directly (or reaching the one flat surface 9 after reflecting via total reflection on the other flat surface 11) can be emitted from the other flat surface 11 to an outside area and in a direction corresponding to the light-emission direction of the LED lighting unit 1 similar to the manner described with respect to FIG. 5.

In addition, light can be emitted from the plurality of LEDs 2 and enter into the light guide 3. The portion of light L3 that directly reaches the other end surface 6 opposite to the one end surface 5 of the light guide 3 after being guided in the light guide 3 and repeating a total reflection between the one flat surface 9 and the other flat surface 11 of the light guide 3 can be emitted from the other end surface 6 to an outside area and can reach the reflector 8 on the bend portion 7 of the reflection board 4. The light reflected by the reflector 8 can be emitted in a direction corresponding to the light-emission direction of the LED lighting unit 1.

Moreover, when forming the reflector 13 on the flat portion 12 of the reflection board 4, light L4 that exits the one flat surface 9 of the light guide 3 towards the reflection board 4 can be emitted from the other flat surface 11 to an outside area in a direction corresponding to the light-emission direction of the LED lighting unit 1 by reflecting on the reflector 13 of the flat portion 12 of the reflection board 4 and then entering back into the light guide 3.

Thus, light use efficiency improves by decreasing a ratio of an amount of light emitted from the plurality of LEDs 2 to an amount of light that is not illuminated from the LED lighting unit 1. Thus, an increase of surface brightness on the other flat surface 11 of the light guide 3 can be achieved and result in a bright illuminating area of the LED lighting unit 1.

Figure 7:
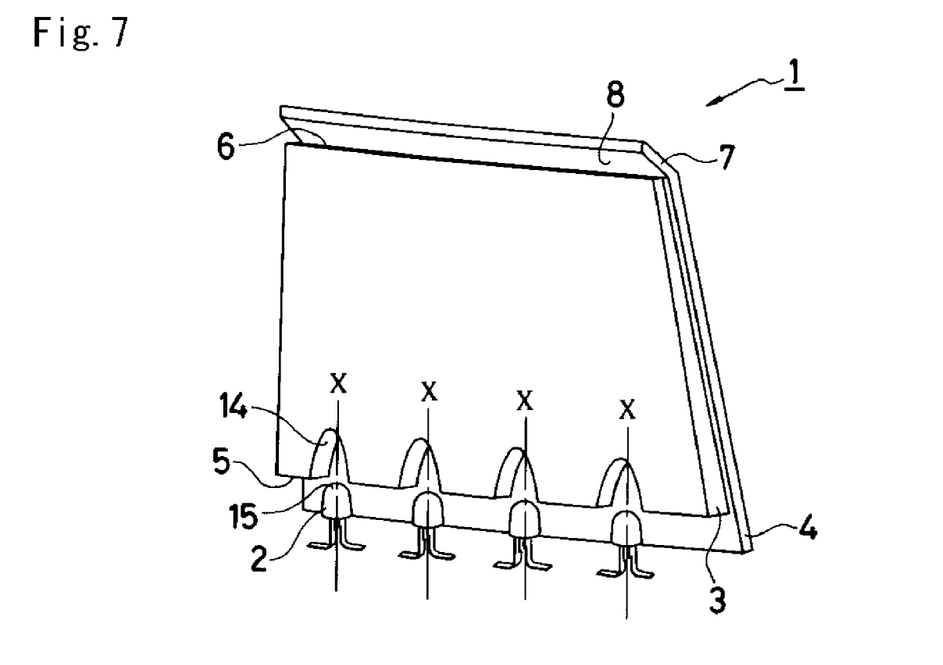
FIG. 7 is a perspective showing another LED lighting unit made in accordance with principles of the disclosed subject matter.
Figure 8:
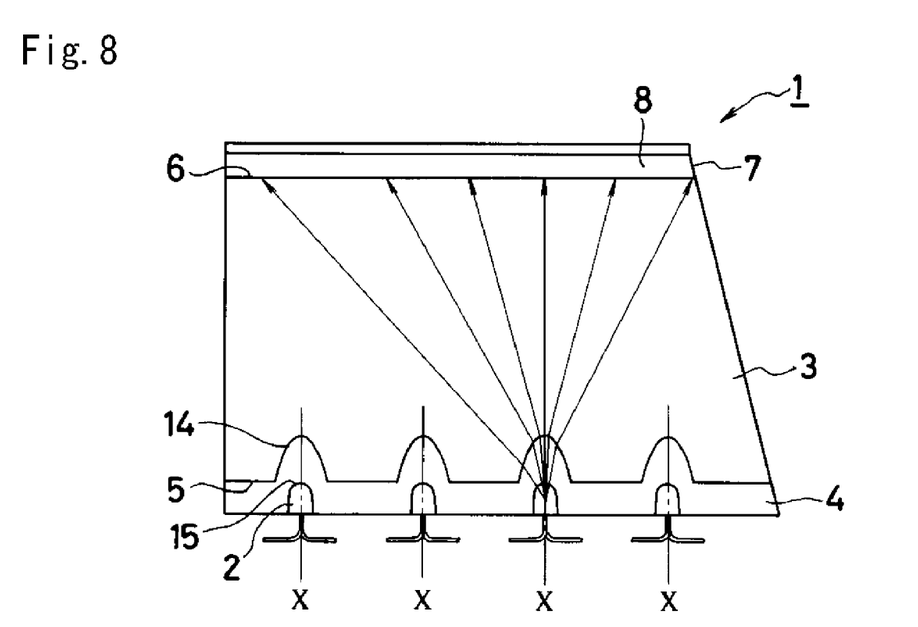
FIG. 8 is a front view of the LED lighting unit shown in FIG. 7.

FIG. 7 is a perspective view showing another LED lighting unit made in accordance with principles of the disclosed subject matter. FIG. 8 is a front view showing the LED lighting unit of FIG. 7. A difference between the LED lighting unit 1 of FIG. 1 and FIG. 7 can be a shape of the one end surface 5 into which light emitted from the plurality of LEDs 2 enters the light guide 3.

More specifically, the one end surface 5 of the light guide 3 can include a plurality of two-dimensional concave surfaces 14 each having a central axis corresponding with a respective optical axis of each corresponding one of the plurality of LEDs 2. In this case, if each central axis of the plurality of concave surfaces 14 corresponds with an optical axis of each of the plurality of LEDs 2, each convex lens 15 of the plurality of LEDs 2 can be located in or out of each of the plurality of concave surfaces 14.

In the LED lighting unit 1 composed of the above-described light guide 3, because each area of the plurality of concave surfaces 14 in which light emitted from each of the plurality of LEDs 2 enters can be larger than a flat surface of the one end surface 5 (as shown in rear view of FIG. 5) and can be wider with respect to each optical axis X of the plurality of LEDs 2, each of the plurality of concave surfaces 14 can receive light into the light guide 3 with high efficiency. As a result, the increased light use efficiency can result in a bright LED lighting unit 1.

With reference to the reflection board 4, the reflector 8 can be formed only on the bend portion 7, or reflector 13 can be formed on the flat portion 12 of the reflection board 4 along with the reflector 8 on the bend portion 7. In this case, when both the reflector 8 and the reflector 13 are used, a higher efficiency can be achieved as compared to the case when only reflector 8 as described above is used.

Figure 9:
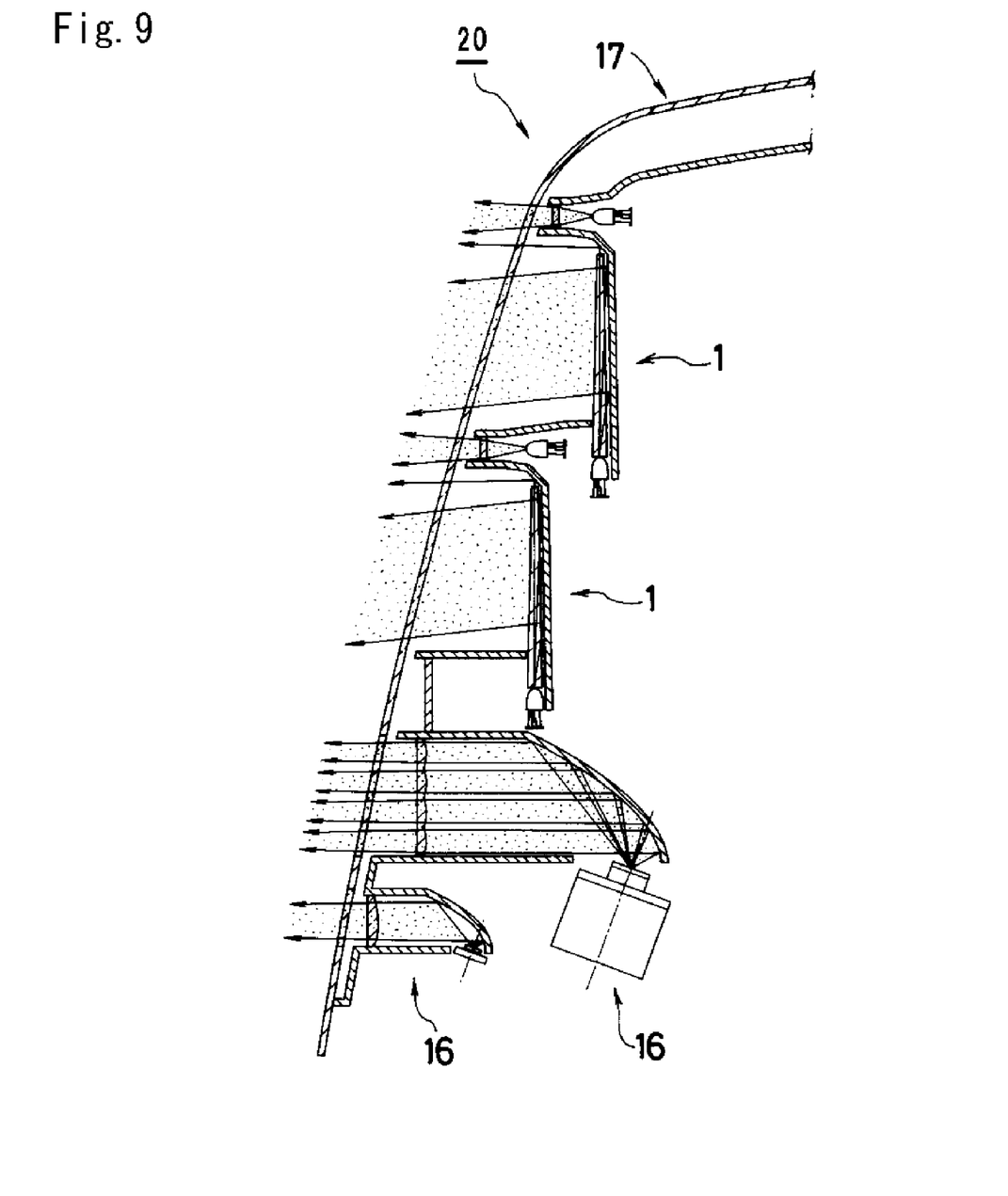
FIG. 9 is a cross-section view showing a vehicle lamp including a LED lighting unit made in accordance with principles of the disclosed subject matter.

FIG. 9 is a cross-section view showing a vehicle lamp including an example of an LED lighting unit made in accordance with principles of the disclosed subject matter. A vehicle lamp 20 can include at least one LED lighting unit 1 and a casing 17 that attaches to the at least one LED lighting unit 1 so as to conform to a light distribution standard. The vehicle lamp 20 can also include other lighting units 16 in the casing 17.

As described above, the disclosed subject matter can provide an LED lighting unit that has high efficiency with respect to light use. In addition, the LED lighting unit can form a light distribution that has the highest brightness on a central portion in a relative narrow area using light reflected on the reflector of the bend portion, and can form a light distribution that has a high uniformity with a relative wide range using light emitted from a flat surface of the light guide. Thus, the LED lighting unit can conform to optical characteristics such as brightness at various measuring points, light distribution characteristics, and the like, for a vehicle lamp.

The LED lighting unit is not limited for use in a vehicle lamp and can be used in various other applications such as a general lighting, a flat panel display, etc. Various modifications of the above disclosed embodiments can be made without departing from the spirit and scope of the presently disclosed subject matter. For example, the diffusion pattern can be formed on either flat surface of the light guide or both flat surface and can even be formed on the end surface(s) of the light guide if desired. In addition, while the bend portion is shown as extending substantially linearly away from the reflection board, it is conceivable that the bend portion be arcuate, or composed of a plurality of shaped portions such as ellipse shaped portions, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An LED lighting unit, comprising:
a light guide including a flat panel formed of a transparent material and including one end surface, one other end surface located opposite to the one end surface, and one flat surface located between the one end surface and the other end surface and including a plurality of light diffusing patterns located on the one flat surface;
a plurality of LEDs located along the one end surface of the light guide, each of the LEDs having an optical axis, and at least a portion of the LED optical axes being substantially parallel with respect to each other and directed towards the other end surface of the light guide; and
a reflection board including a flat member having a bend portion and a reflector located on the bend portion, the reflection board extending from one end of the reflection board to an opposite end of the reflection board and along the one flat surface of the light guide, the bend portion being located at the opposite end of the reflection board and extending towards the optical axes of the LEDs at a predetermined angle.

2. The LED lighting unit according to claim 1, wherein a diffusing intensity of the plurality of light diffusing patterns on the one flat surface of the light guide sequentially increases from the one end surface of the light guide towards the other end surface of the light guide.

3. The LED lighting unit according to claim 1, wherein the light guide tapers from a thick portion at the one end surface of the light guide towards a relatively thinner portion at the other end surface of the light guide.

4. The LED lighting unit according to claim 2, wherein the light guide tapers from a thick portion at the one end surface of the light guide towards a relatively thinner portion at the other end surface of the light guide.

5. The LED lighting unit according to claim 1, wherein each of the plurality of light diffusing patterns is formed as at least one of a round shape and a polygonal shape.

6. The LED lighting unit according to claim 2, wherein each of the plurality of light diffusing patterns is formed as at least one of a round shape and a polygonal shape.

7. The LED lighting unit according to claim 3, wherein each of the plurality of light diffusing patterns is formed as at least one of a round shape and a polygonal shape.

8. The LED lighting unit according to claim 4, wherein each of the plurality of light diffusing patterns is formed as at least one of a round shape and a polygonal shape.

9. The LED lighting unit according to claim 1, wherein the one end surface of the light guide includes two-dimensional concave surfaces each having a central axis corresponding with a respective one of the optical axes of the plurality of LEDs.

10. The LED lighting unit according to claim 2, wherein the one end surface of the light guide includes two-dimensional concave surfaces each having a central axis corresponding with a respective one of the optical axes of the plurality of LEDs.

11. The LED lighting unit according to claim 3, wherein the one end surface of the light guide includes two-dimensional concave surfaces each having a central axis corresponding with a respective one of the optical axes of the plurality of LEDs.

12. The LED lighting unit according to claim 4, wherein the one end surface of the light guide includes two-dimensional concave surfaces each having a central axis corresponding with a respective one of the optical axes of the plurality of LEDs.

13. The LED lighting unit according to claim 5, wherein the one end surface of the light guide includes two-dimensional concave surfaces each having a central axis corresponding with a respective one of the optical axes of the plurality of LEDs.

14. A vehicle lamp including the LED lighting unit according to claim 1, comprising:
  at least the LED lighting unit; and
  a casing located adjacent the LED lighting unit.

15. A vehicle lamp including the LED lighting unit according to claim 2, comprising:
  at least the LED lighting unit; and
  a casing located adjacent the LED lighting unit.

16. A vehicle lamp including the LED lighting unit according to claim 3, comprising:
  at least the LED lighting unit; and
  a casing located adjacent the LED lighting unit.

17. A vehicle lamp including the LED lighting unit according to claim 4, comprising:
  at least the LED lighting unit; and
  a casing located adjacent the LED lighting unit.

18. An LED lighting unit, comprising:
  a light guide formed of a transparent material and including one end surface, one other end surface located opposite to the one end surface, and one flat surface located between the one end surface and the other end surface and including a plurality of light diffusing patterns located on the one flat surface;
  a plurality of LEDs located along the one end surface of the light guide, each of the LEDs having an optical axis, and at least a portion of the LED optical axes being substantially parallel with respect to each other and directed towards the other end surface of the light guide; and
  a reflection board extending adjacent to and along the one flat surface of the light guide from one end portion of the reflection board to an opposite end portion of the reflection board, the one end portion of the reflection board being located closer to the plurality of LEDs than the opposite end portion of the reflection board, and the opposite end portion of the reflection board including a bend portion having a reflector portion, the bend portion intersecting with the LED optical axes that are substantially parallel with respect to each other and that are directed towards the other end surface of the light guide.

19. The LED lighting unit according to claim 18, wherein the light guide includes a second flat surface located between the one end surface and the other end surface of the light guide, the first flat surface located closer to the reflection board than the second flat surface in a direction substantially normal to the first flat surface.

20. The LED lighting unit according to claim 19, wherein the first flat surface is angled with respect to the second flat surface such that a first distance between the first flat surface and the second flat surface is greater at a location closer to the plurality of LEDs than a second distance between the first flat surface and the second flat surface at a location further from the plurality of LEDs.

21. The LED lighting unit according to claim 18, wherein the bend portion and the light guide are configured such that directional axes extending substantially normal to the other end surface of the light guide and from a substantial portion of the other end surface of the light guide intersects with the bend portion of the reflection board.

* * * * *